United States Patent
Della Polla

(10) Patent No.: US 9,481,387 B2
(45) Date of Patent: Nov. 1, 2016

(54) TRANSPORT DOLLIES

(71) Applicant: Michael Della Polla, Kennesaw, GA (US)

(72) Inventor: Michael Della Polla, Kennesaw, GA (US)

( * ) Notice: Subject to any disclaimer, the term of this patent is extended or adjusted under 35 U.S.C. 154(b) by 12 days.

(21) Appl. No.: 14/484,674

(22) Filed: Sep. 12, 2014

(65) Prior Publication Data

US 2016/0075362 A1    Mar. 17, 2016

(51) Int. Cl.
*B62B 1/00*    (2006.01)
*B62B 5/00*    (2006.01)
*B62B 3/02*    (2006.01)

(52) U.S. Cl.
CPC .............. *B62B 5/0093* (2013.01); *B62B 3/02* (2013.01); *B62B 2206/02* (2013.01); *B62B 2501/04* (2013.01)

(58) Field of Classification Search
CPC .......... B62B 1/00; B62B 5/0093; B62B 3/02
USPC .......... 28/651, 656, 65.1, 79.11, 79.3, 47.34, 28/638; 280/651, 656, 65.1, 79.11, 79.3, 280/47.34, 638, 32.6
See application file for complete search history.

(56) References Cited

U.S. PATENT DOCUMENTS

| | | | |
|---|---|---|---|
| 811,657 A * | 2/1906 | Brien | 211/27 |
| 2,124,389 A * | 7/1938 | Woelfer, Jr. | 280/32.6 |
| 2,692,636 A * | 10/1954 | Morrison | 280/32.6 |
| 2,751,233 A * | 6/1956 | Racker | 280/641 |
| 3,558,152 A * | 1/1971 | Miles et al. | 280/47.16 |
| 3,632,162 A | 1/1972 | Trethaway | |
| 3,933,275 A * | 1/1976 | Metzner et al. | 222/131 |
| 4,060,252 A * | 11/1977 | Mowery | 280/79.11 |
| 4,118,048 A | 10/1978 | Spranger et al. | |
| 4,127,202 A * | 11/1978 | Jennings et al. | 280/79.11 |
| 4,166,638 A | 9/1979 | De Prado | |
| 4,171,828 A * | 10/1979 | Goodwin et al. | 280/638 |
| 4,505,495 A * | 3/1985 | Foss et al. | 280/651 |
| 5,484,150 A * | 1/1996 | Yasutomi | 280/79.3 |
| 5,632,052 A | 5/1997 | Michel | |
| 5,711,429 A * | 1/1998 | Brown | 280/79.7 |
| 5,857,685 A * | 1/1999 | Phillips et al. | 280/47.35 |
| 5,918,750 A * | 7/1999 | Jackson | 211/189 |
| 6,079,941 A * | 6/2000 | Lee | 414/812 |
| 6,457,595 B1 * | 10/2002 | Pritchard et al. | 211/189 |
| 7,014,198 B2 * | 3/2006 | Everitt et al. | 280/47.34 |
| 7,036,833 B1 | 5/2006 | Berna et al. | |
| 8,025,161 B2 | 9/2011 | Chookang | |
| 8,042,829 B2 * | 10/2011 | Hailston et al. | 280/655.1 |
| 8,317,451 B2 | 11/2012 | Cozza | |
| 8,590,921 B2 * | 11/2013 | Benson et al. | 280/656 |
| 8,602,443 B2 | 12/2013 | Moore et al. | |

(Continued)

FOREIGN PATENT DOCUMENTS

| | | |
|---|---|---|
| CA | 2187261 | 4/1998 |
| EP | 0835794 | 4/1998 |

(Continued)

*Primary Examiner* — Hau Phan

(57) ABSTRACT

In one embodiment, a transport dolly includes a base having a generally horizontal platform adapted to support an object to be moved and generally vertical side walls that extend downward from edges of the platform toward a floor or ground surface, and casters mounted to a bottom surface of the platform between the side walls, the casters being dimensioned such that bottom edges of the side walls nearly touch the floor or ground surface such that the casters are enclosed and protected by the side walls.

13 Claims, 7 Drawing Sheets

(56) References Cited

U.S. PATENT DOCUMENTS

| | | | |
|---|---|---|---|
| 8,641,060 B2 * | 2/2014 | Starr et al. | 280/79.5 |
| 8,882,115 B1 * | 11/2014 | Roy | 280/79.11 |
| 2006/0103094 A1 * | 5/2006 | Wiff et al. | 280/79.11 |
| 2013/0187352 A1 | 7/2013 | Hassell et al. | |
| 2014/0021691 A1 | 1/2014 | Buttazzoni et al. | |

FOREIGN PATENT DOCUMENTS

| | | |
|---|---|---|
| EP | 2570358 | 3/2013 |
| JP | 3046163 | 2/1998 |
| JP | 2003327125 | 11/2003 |
| JP | 2009220653 | 10/2009 |
| WO | WO2013181620 | 12/2013 |

\* cited by examiner

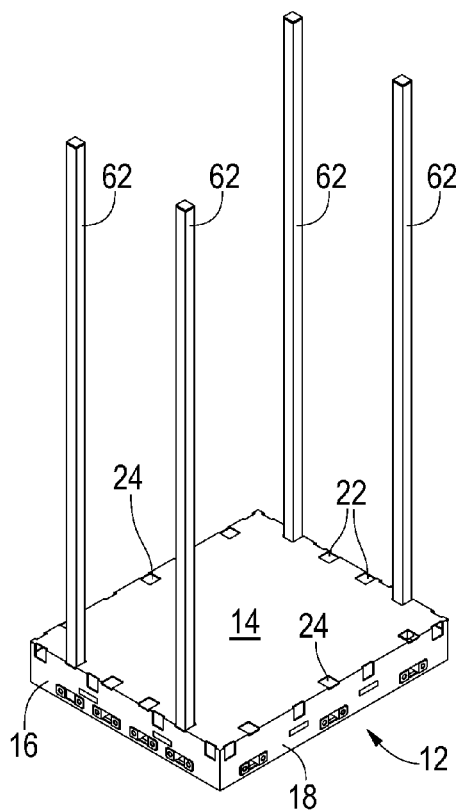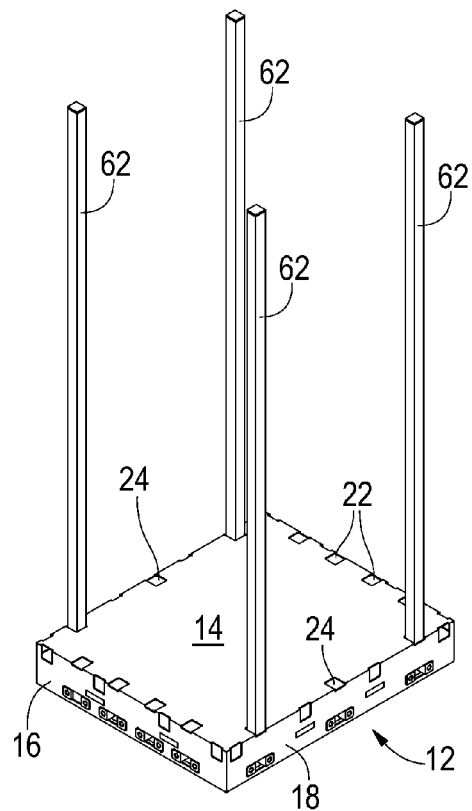
FIG. 7   FIG. 8

TRANSPORT DOLLIES

BACKGROUND

Large, cumbersome, or heavy objects, such as mattresses, furniture, and large flat screen televisions are often moved using a transport dolly. While transport dollies can take a variety of forms, the typical transport dolly at least includes a platform upon which objects can be placed and wheels that enable the platform to be easily moved across a surface, such as a floor, sidewalk, or road.

While such dollies simplify the movement of objects, their platforms are often relatively high off of the ground, which can make it difficult to load heavy objects onto the dolly. In addition, many dollies have no handles, in which case the user must push on the object, instead of the dolly, to move the object. In such a case, the object may fall off of the dolly if an obstruction such as a doorway threshold is encountered by the dolly as the object is being moved. Dollies that do have handles often limit the size of the load that can be carried. In addition, the wheels of conventional dollies are typically exposed and are therefore vulnerable to damage from running into an obstruction.

Many dollies, such as those for large objects like mattresses, also tend to be relatively large and heavy, which makes them difficult to maneuver and store. Moreover, such dollies tend to have fixed vertical posts that, although useful for supporting objects and pushing the dolly, preclude the dolly from being used to transport objects that do not fit between the posts.

From the above discussion, it can be appreciated that it would be desirable to have a transport dolly that avoids at least some of the aforementioned drawbacks of conventional transport dollies.

BRIEF DESCRIPTION OF THE DRAWINGS

The present disclosure may be better understood with reference to the following figures. Matching reference numerals designate corresponding parts throughout the figures, which are not necessarily drawn to scale.

FIG. 7 is a top perspective view of the transport dolly of FIG. 1 showing vertical posts inserted into a platform of the dolly in a first configuration.

FIG. 8 is a top perspective view of the transport dolly of FIG. 1 showing vertical posts inserted into a platform of the dolly in a second configuration.

DETAILED DESCRIPTION

As described above, it would be desirable to have a transport dolly that avoids at least some of the drawbacks of conventional transport dollies. Disclosed herein are examples of such transport dollies. In one embodiment, a transport dolly includes a base having a generally horizontal platform and generally vertical sides that extend downward from the edges of the platform to a point near the floor or ground surface. In some embodiments, the platform and sides are rectangular, in which case the base forms a "box" having eight orthogonal corners. Mounted to a bottom surface of the platform between the sides are wheels that support the base above the floor or ground surface. In some embodiments, the platform includes multiple openings that are adapted to receive removable posts that can be used to support objects loaded onto the platform and that can be used as handles to push or pull the dolly. In some embodiments, the sides include multiple openings that are adapted to receive removable posts that can be used to extend the support surface of the dolly and/or support additional wheels that facilitate movement of the dolly up and down inclines.

In the following disclosure, various specific embodiments are described. It is to be understood that those embodiments are example implementations of the disclosed inventions and that alternative embodiments are possible. All such embodiments are intended to fall within the scope of this disclosure.

Figure 1:
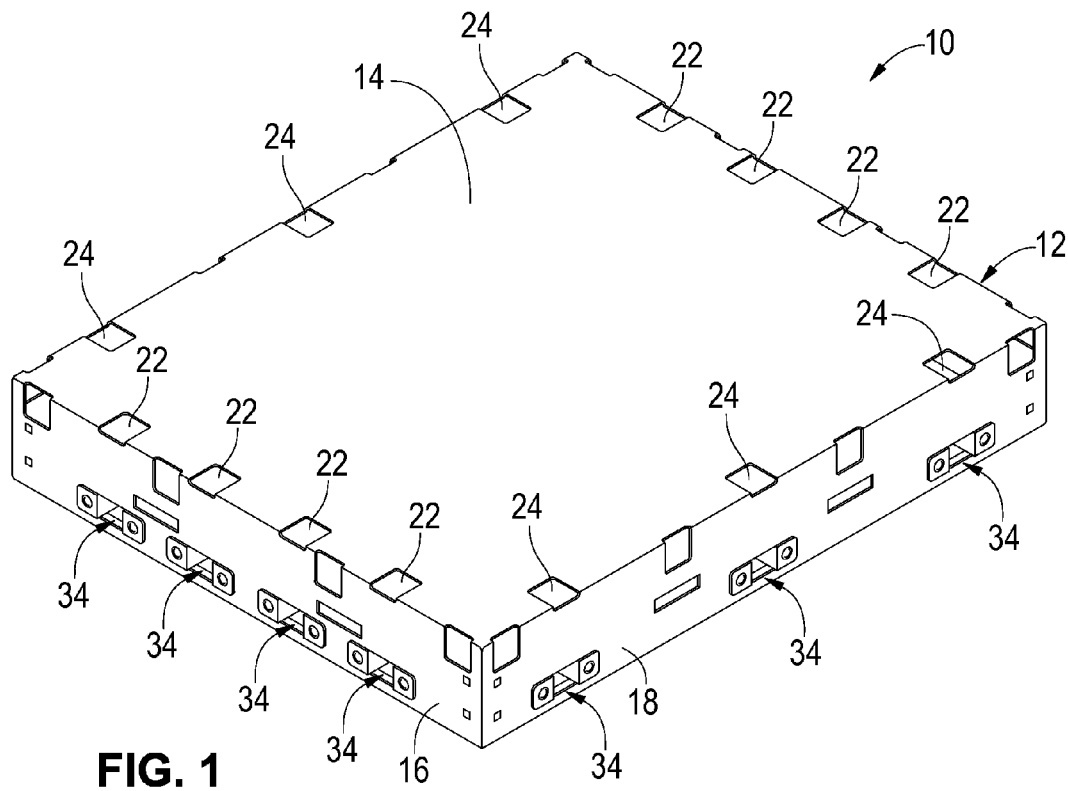
FIG. 1 is a top perspective view of a first embodiment of a transport dolly.
Figure 4:
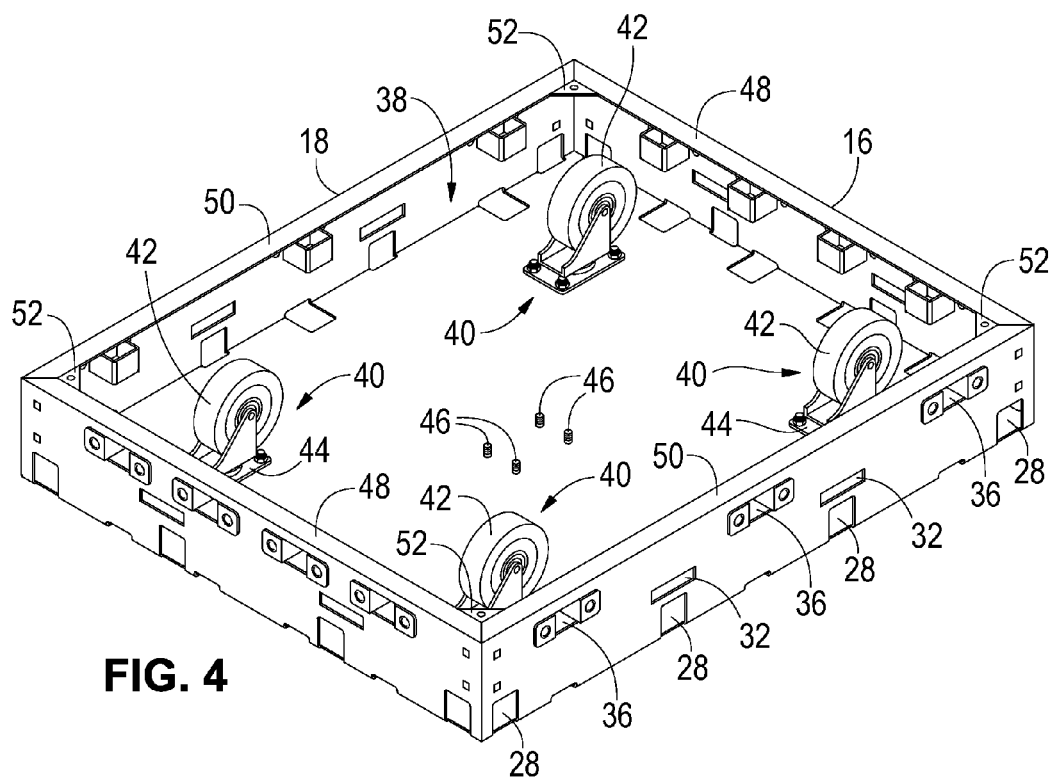
FIG. 4 is a bottom perspective view of the transport dolly of FIG. 1.
Figure 5:
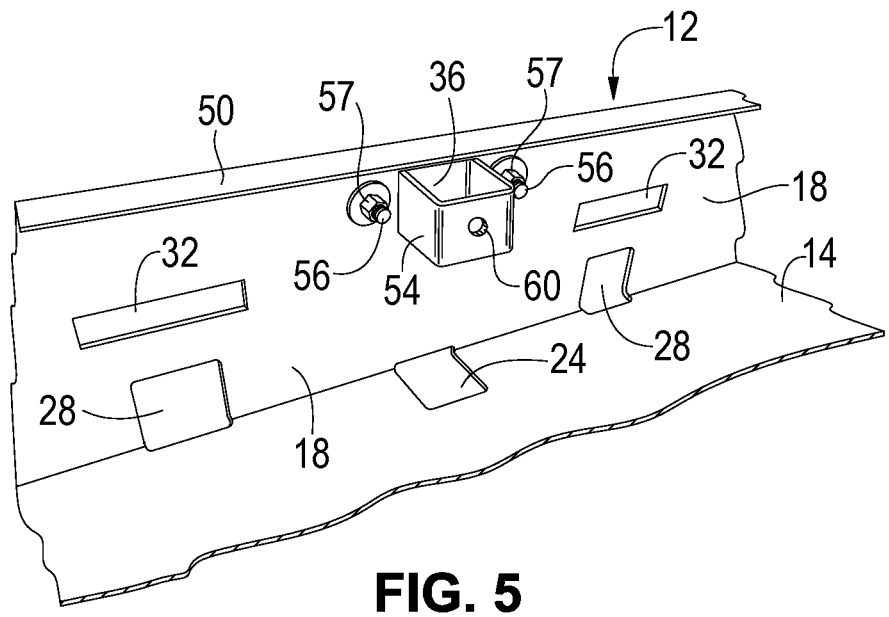
FIG. 5 is a detail bottom view of a support structure of the transport dolly of FIG. 1.
Figure 6:
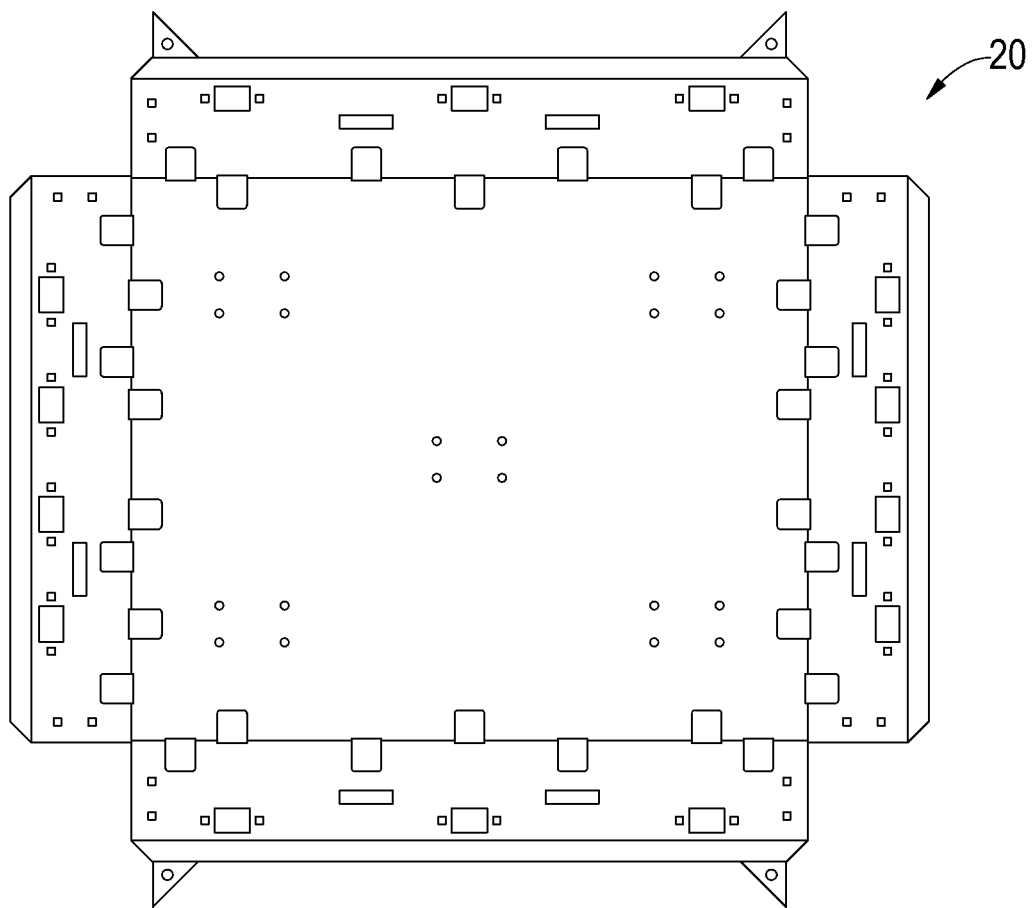
FIG. 6 is a plan view of a sheet of metal prior to being folded and welded to form a base of the transport dolly of FIG. 1.

FIGS. 1-9 illustrate a first embodiment of a transport dolly 10 that can be used to move objects. With particular reference to FIG. 1, the dolly 10 generally comprises a base 12 that includes a generally horizontal platform 14 and multiple generally vertical sides 16 and 18 that extend downward from the edges of the platform. In the illustrated embodiment, the platform 14 and the sides 16, 18 are rectangular so that the base 12 forms a box having eight orthogonal corners. As is apparent from FIG. 1, the platform 14 has a smaller width than length, such that the sides 16 are shorter than the sides 18. The dimensions of the base 12 can be selected based upon the particular application in which the dolly 10 will be used. As an example, however, the platform 14 can have a width of approximately 25 inches and a length of approximately 30 inches, and the sides 16, 18 can have a height of approximately 4.5 inches. In some embodiments, the base 12, including the platform 14 and sides 16, 18, are unitarily formed from a single piece of material. For example, the base 12 can be formed from a single metal plate that is folded and welded to take the form of the base shown in FIG. 1. FIG. 6 shows an example metal plate 20 prior to such folding and welding. By way of example, the plate 20 can be made of steel and can be approximately 1.27 to 3.57 mm thick.

With reference back to FIG. 1, the platform 14 includes multiple openings 22 and 24 that are adapted to receive removable vertical posts. These openings 22, 24 are formed around the edges of the platform 14. In the example of FIG. 1, there are four openings 22 provided along the edges from which the sides 16 extend downward, and there are three openings 22 provided along the edges from which the sides 18 extend downward. As is described below, vertical posts can be inserted into one or more of the openings 22, 24 and supported therein to provide lateral support to objects on the platform and/or enable a user to move the dolly without pushing on the object it supports. In the illustrated embodiment, the openings 22, 24 are rectangular, in which case the posts can have rectangular cross-sections.

Figure 2:
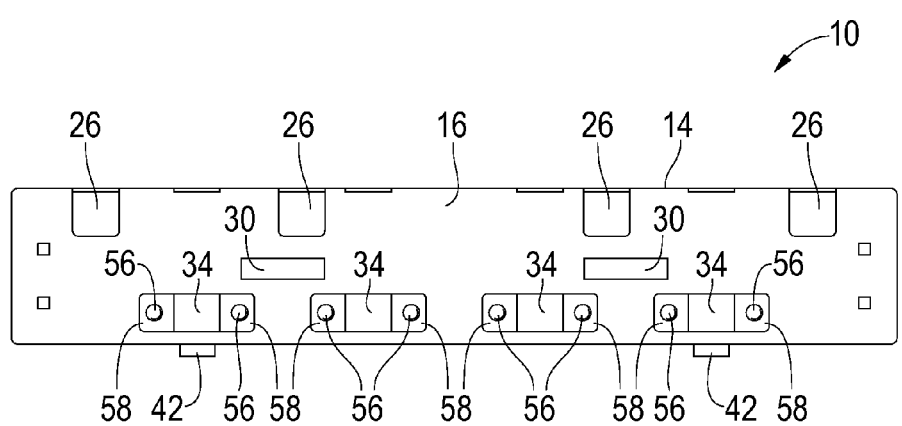
FIG. 2 is a first side view of the transport dolly of FIG. 1.
Figure 3:
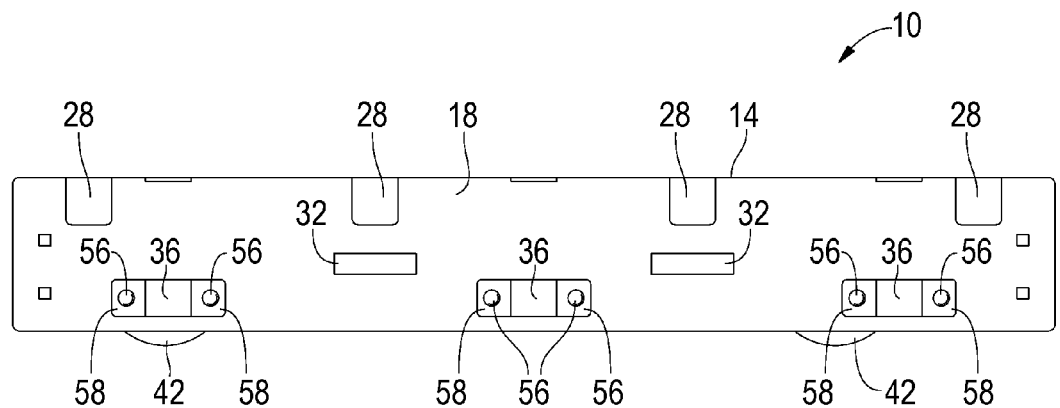
FIG. 3 is a second side view of the transport dolly of FIG. 1.

The sides 16, 18 can also include multiple openings. As shown most clearly in FIG. 2, the sides 16 can, for example, include openings 26 formed along their top edges that are adapted to receive removable horizontal posts. In a similar manner, the sides 18 can, for example, include openings 28 formed along their top edges, as shown in FIG. 3, that are also adapted to receive removable horizontal posts. In the illustrated example, both the sides 16 and the sides 18 include four openings 26, 28. As with the openings 22, 24, the openings 26, 28 can be rectangular, in which case the received posts can have rectangular cross-sections. When the openings 26 of both sides 16 align with each other or the openings 28 of both sides 18 align with each other, a post can be passed through an opening of two opposed sides such that the post completely passes through the base 12 (see FIG. 12).

In some embodiments, the sides 16, 18 include further openings. For example, as illustrated in FIGS. 2 and 3, the sides 16 and the sides 18 can include tie-down strap openings 30 and 32, respectively, that can be used to attach a tie-down strap to the base 12. By way of example, hooks of the tie-down strap can be passed through the openings 30, 32 and the strap can be tightened around an object supported by the base 12.

With further reference to FIGS. 2 and 3, the sides 16 and the sides 18 can also include openings 34 and 36, respectively, that enable the mounting of support brackets (described below) to the base 12 that are associated with each of the openings 22, 24 and support a vertical post that has been passed through its associated opening. As shown in FIGS. 2 and 3, the openings 34, 36 can be positioned near the bottom edges of the sides 16, 18.

Referring next to FIG. 4, the dolly 10 is illustrated upside down so as to reveal its underside. As can be appreciated from this figure, the "box" formed by the base 12 is open. Specifically, there is no lower platform opposite the platform 14 that would form a closed box shape. As can also be appreciated from FIG. 4, the base 12 is hollow such that it forms an interior space 38 that is defined by the platform 14 and the sides 16, 18, which laterally enclose the space 38. Within the space 38 are multiple casters 40, each comprising a wheel 42 and a mounting bracket 44 that enables the wheel to swivel about a vertical axis. Each of the casters 40 is mounted to a bottom surface of the platform 14 with its associated bracket 44. In the illustrated embodiment, the dolly 10 includes four such casters 40, one provided at each corner of the platform 14. It is noted, however, that a fifth caster can be mounted in the center of the platform 14 using studs 46 that extend down from the platform 14.

Irrespective of casters 40 that are used, they are of a height that supports the base 12 above the floor or ground surface such that the bottom edges of the sides 16, 18 are spaced only a small distance above the surface. In some embodiments, the casters 40 support the base 12 so there is only approximately 10 to 20 mm between the bottom edges of the sides 16, 18 and the floor or ground surface. When the clearance and the heights of the sides 16, 18 are small, and the top of the platform 14 is low, it is much easier to load the dolly 10. In some embodiments, the top of the platform 14 of the base 12 is no more than 4 to 6 inches above the floor or ground surface. It is also noted that, because the sides 16, 18 are close to the floor or ground surface, the casters 40 are surrounded in all directions by the sides and therefore protected from contact with obstructions that could damage them.

As is further illustrated in FIG. 4, the sides 16 and the sides 18 each form lips 48 and 50, respectively. These lips 48, 50 are welded together at their ends (in the bottom corners of the base 12) so as to form a continuous lip that extends along the bottom edges of the sides 16, 18 toward the center of the base 12 in a plane that is generally parallel to the platform 14. Additional material can be provided at each corner of the base 12 where the lips 48, 50 meet to provide reinforcement. In particular, each of the bottom corners of the base 12 can include a triangular element 52 that provides this reinforcement. By way of example, each lip 48, 50 can be approximately 1 inch in width and can be unitarily formed with its associated the side 16, 18. As is described below, the lips 48, 50 also provide support to vertical posts that are passed through the platform 14.

FIG. 5 is a detail view of the underside of the base 12 that reveals a support structure adapted to support a vertical post that is inserted through one of the openings 22, 24 provided in the platform 14. More particularly, FIG. 5 is a detail view of a support structure provided on a side 18 of the base 12. As illustrated in the figure, a support bracket 54 is mounted to the side 18 with threaded fasteners 56, such as threaded bolts, that are secured with threaded nuts 57. In the illustrated embodiment, the bracket 54 comprises a continuous strip of metal, which may be similar to metal used to form the base 12, that has been bent so as to form a U-shaped bracket having outwardly extending tabs 58 (see FIGS. 2 and 3) at the ends of the "U" through which the threaded fasteners 56 can pass. As shown in FIGS. 2 and 3, the tabs 58 of the bracket 54 can be positioned so they rest upon the outer surfaces of the sides 16, 18, and the remainder of the bracket passes through an opening 34, 36 to achieve a configuration like that shown in FIG. 5.

When the bracket 54 is mounted to the side 18 in the manner depicted in FIG. 5, a post can be passed through the opening 24 (or opening 22) in the platform 14, passed through the U-shaped bracket 54, and supported by the lip 50 (or lip 48). The post is then supported by the support structure, which can be characterized as including the opening 24 (or opening 22), the bracket 54, and the lip 50 (or lip 48). As is further shown in FIG. 5, each bracket 54 can include a central opening 60 that is adapted to receive a fastener, such as a locking pin, which can be used to secure the post in place and prevent its unintended removal.

FIGS. 7 and 8 show two examples of removable vertical posts 62 being inserted into and supported by the base 12. In both figures, the posts 62 have rectangular (square) cross-sections and each is approximately 4 to 5 feet long. Beginning with FIG. 7, four vertical posts 62 have been inserted into the base 12, with two posts 62 inserted into openings 22 provided in the two opposed sides 16. Turning to FIG. 8, two posts 62 have been inserted into openings 24 provided in the two opposed sides 18. FIGS. 7 and 8 illustrate just two of numerous configurations that can be achieved. Generally speaking, a post 62 can be inserted into any one of the openings 22, 24 as is appropriate for the particular application in which the dolly 10 will be used. Irrespective of how many posts 62 are used, each post 62 is supported by its own support structure comprised of an opening 22, 24, a bracket 54, and a lip 48, 50.

Figure 9:
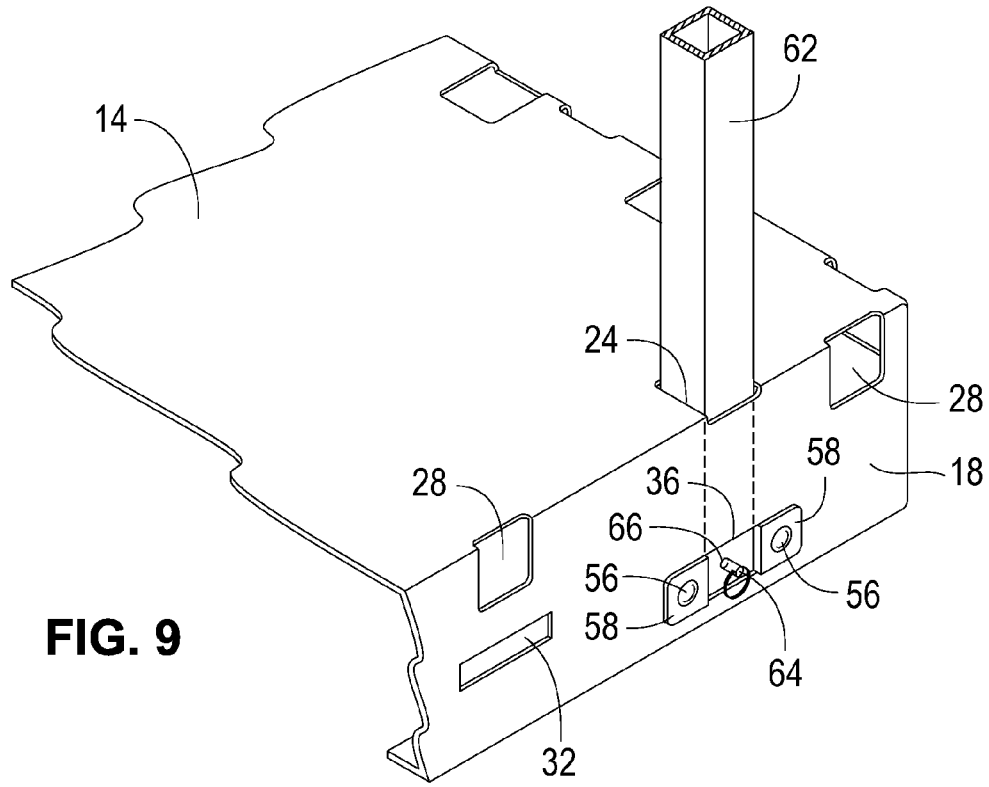
FIG. 9 is a detail view of a post secured to the base of the transport dolly of FIG. 1.
Figure 10:
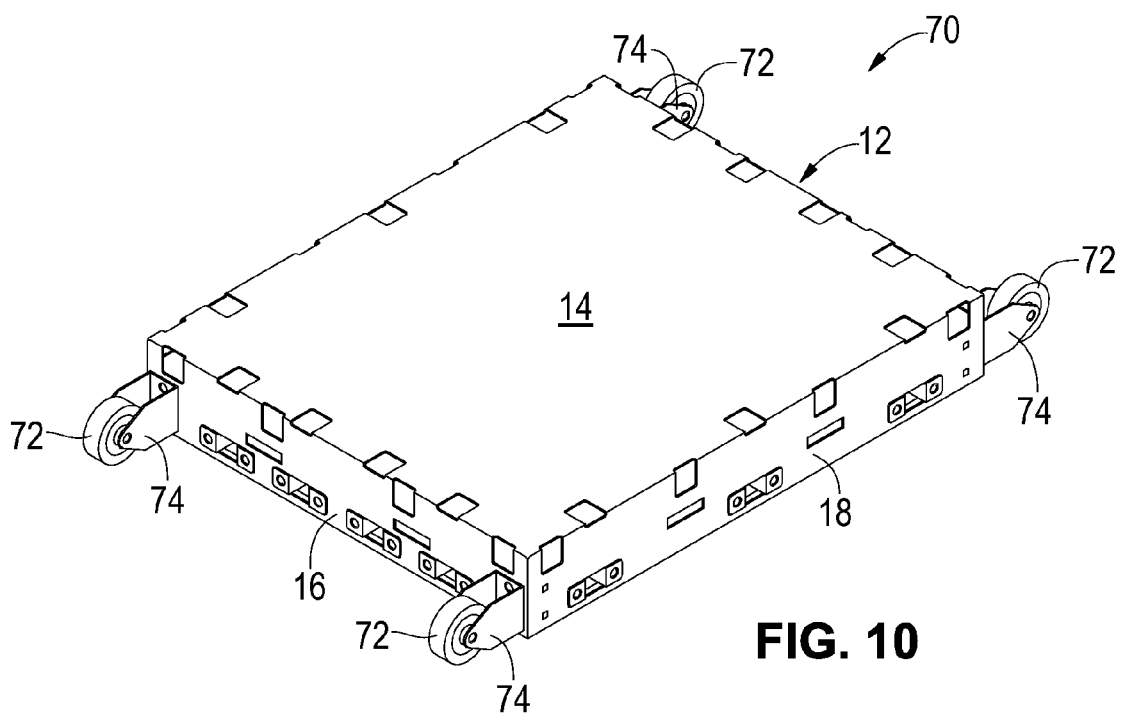
FIG. 10 is a top perspective view of a second embodiment of a transport dolly.

When a post 62 is inserted into an opening 22, 24 and it passes through a bracket 54, its weight is supported by the lip 48, 50. In such a case, the post 62 can be removed by simply pulling it upward out of the opening 22, 24. In some embodiments, the post 62 can be locked in place so as to avoid unintended removal or to enable pulling upward on the dolly 10 using the post. FIG. 9 illustrates one way in which such locking can be achieved. As shown in this figure, a locking pin 64 has been passed through an opening 66 formed near the bottom end of the post 62. When fully inserted, the locking pin 64 passes completely through the post 62 and through the central opening 60 formed in the bracket 54 (see FIG. 5). In some embodiments, the pin 64 comprises a smooth shaft and a spring-biased detent (not visible) that is provided near the distal tip of the shaft.

Figure 11:
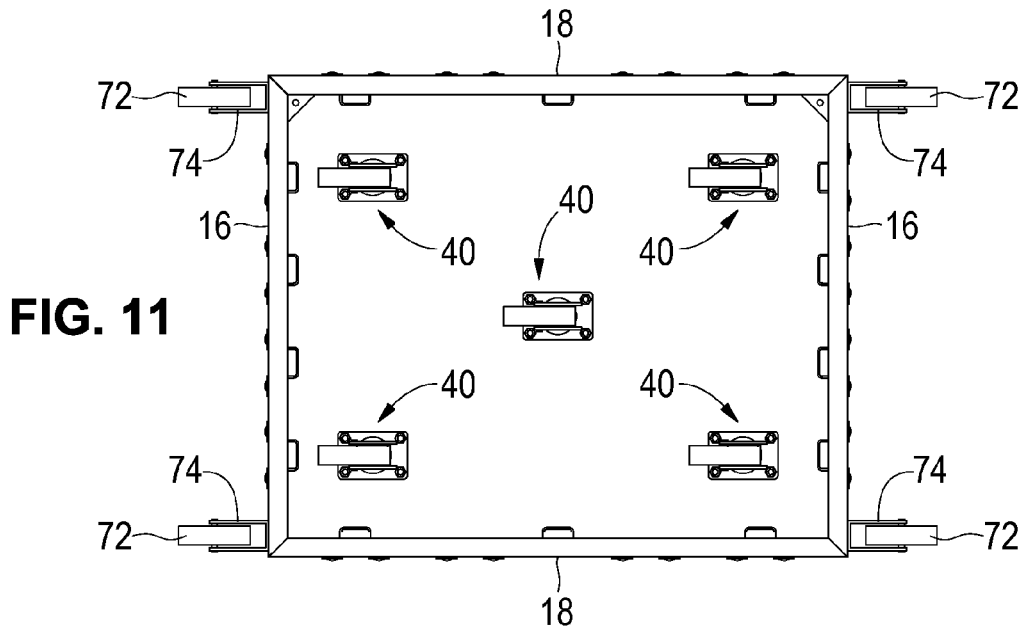
FIG. 11 is a bottom view of the transport dolly of FIG. 10.

FIGS. 10-14 illustrate a second embodiment of a transport dolly 70. The dolly 70 is similar to the dolly 10 in many ways. Accordingly, the dolly 70 includes many of the components of the dolly 10, which have been identified with like reference numerals. The dolly 70, however, includes exposed wheels 72 that are mounted to the sides 16 with mounting brackets 74. Unlike the casters 40 described above, the wheels 72 cannot pivot around an axis. Instead, they can only rotate about their axles. In addition, the wheels 72 are raised above the floor or ground surface when the dolly 10 is on level ground. Like the bottom edges of the sides 16, 18 of the base 12, the wheels 72 can be spaced from the ground by approximately 10 to 20 mm. Because of this, the wheels 72 do not provide support to the dolly 10 when it is moved over an even surface. Instead, the wheels 72 only contact the floor or ground when the dolly 70 is moved from a first surface to another surface having a different angle of incline. For example, the wheels 72 support the dolly 10 when it is pushed from level ground up an inclined ramp. With reference to FIG. 11, the dolly 70 also differs from the dolly 10 in that the dolly 70 includes five casters 40 instead of four. By combining the dolly 70 with the posts 62 of FIG. 9, the dolly can be pivoted like a hand truck for maneuvering up and down stairs.

Figure 12:
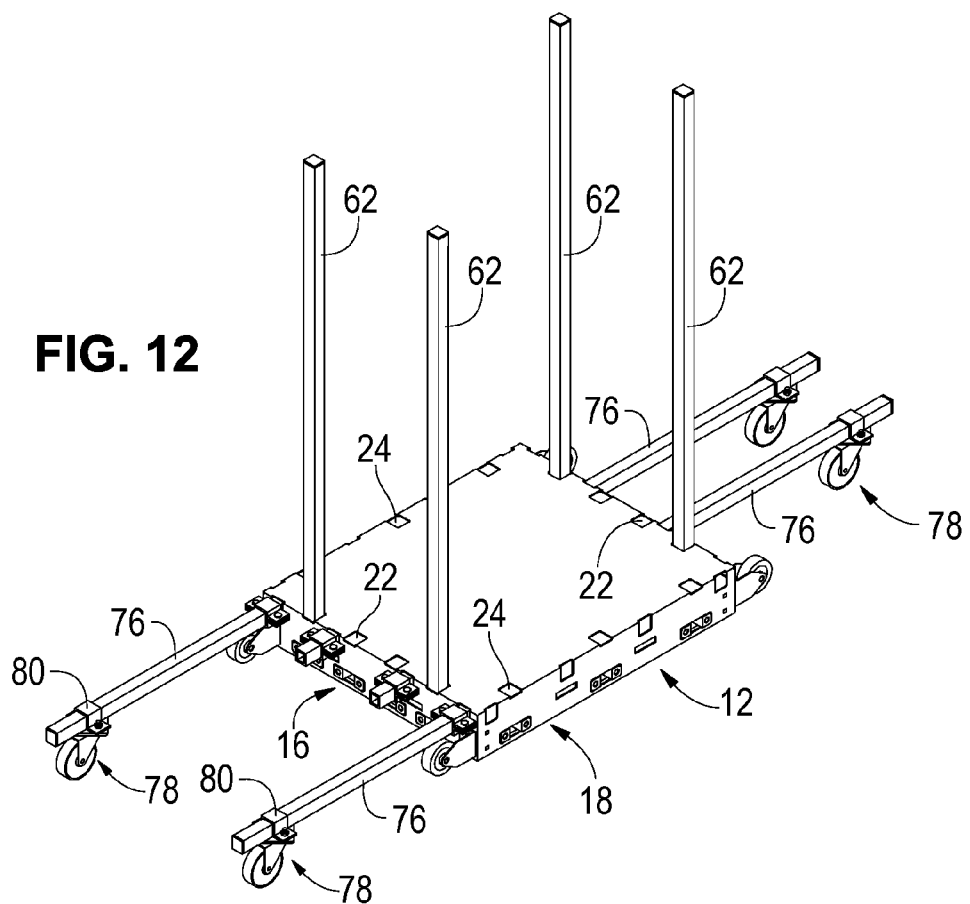
FIG. 12 is a top perspective view of the transport dolly of FIG. 10 showing vertical posts and horizontal posts inserted into the base of the dolly.
Figure 13:
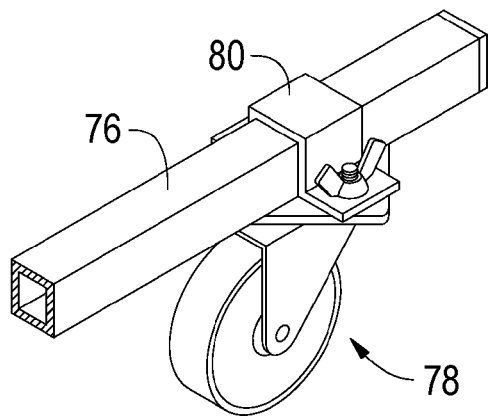
FIG. 13 is a detail view of casters mounted to the horizontal posts shown in FIG. 12.
Figure 14:
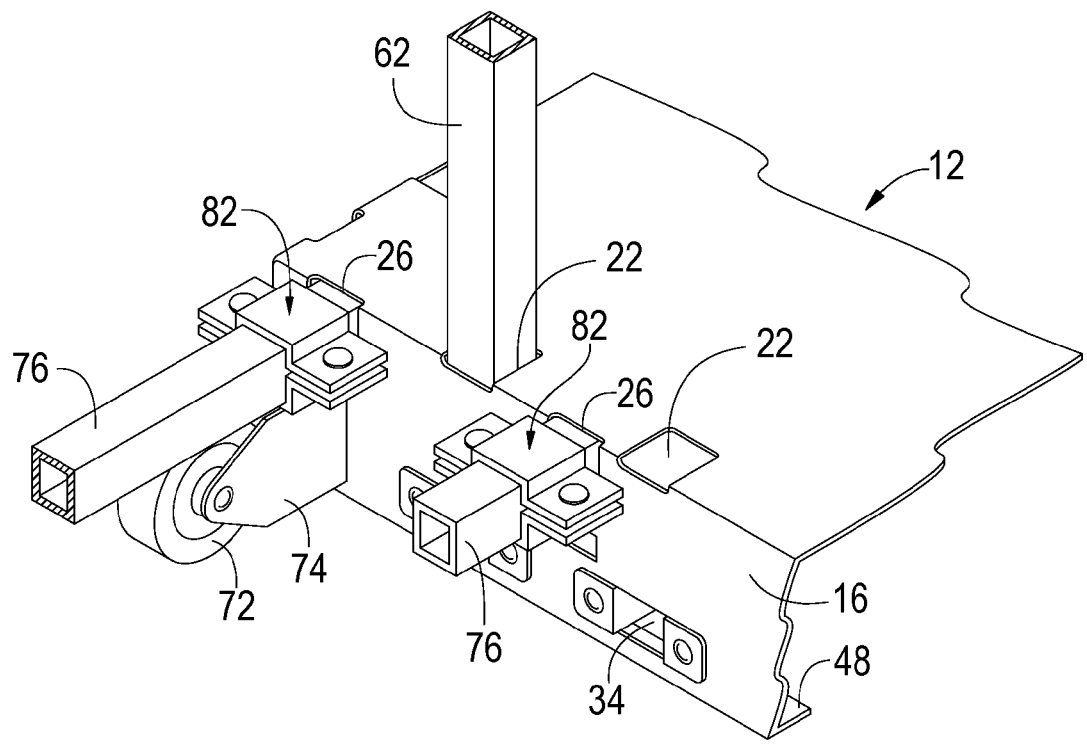
FIG. 14 is a detail view of stops mounted to the horizontal posts shown in FIG. 12.

FIGS. 12-14 show multiple posts attached to the dolly 70. As shown in FIG. 12, removable vertical posts 62 have been inserted into the base 12 with two posts inserted into two openings 22 provided in the two opposed sides 16. In addition, four removable horizontal posts 76 have been passed through openings 26 provided in the sides 16. More particularly, the posts 76 have been passed through the openings 26 so that each one extends a relatively long distance from one side 16 but extends only a relatively short distance from the opposite side. As shown in the detail view of FIG. 13, a caster 78 can be mounted to each long end of each post 76 with an adjustable mounting bracket 80. As shown in the detail view of FIG. 14, an adjustable stop bracket 82 can be mounted to each end of the posts 76, bracketing the base 12 in between. When such a configuration is used, the posts 76 will not move (slide) relative to the base 12 and can be used as an extended platform to support objects on the base 12. In addition, the casters 78 can assist in moving the dolly 70 over uneven surfaces in a similar manner to the wheels 72. The casters 78 on the opposite sides of the base 12, however, are spaced a greater distance apart so that they can be used to move the dolly over greater incline changes. In some embodiments, the casters 78 can be lockable.

The above-described transport dollies provide several advantages over conventional transport dollies. Because the platform is relatively low, it is easier to load the dolly, especially when the object to be moved is heavy. In addition, because posts can be added to the dolly, supported objects can be moved without having to push the objects themselves. Furthermore, because the dolly is small and lightweight, it is much easier to maneuver and store. Because the posts are removable and the base of the dolly is low, it may be possible to store the base beneath another object, such as a storage rack, thereby freeing up floor space. Moreover, because the posts can be connected to the base in multiple orientations, the dolly can be used to support objects having a variety of sizes and shapes.

The invention claimed is:

1. A transport dolly comprising:
   a base including a generally horizontal platform adapted to support an object to be moved, the platform including a bottom surface and a flat continuous top surface having side edges, the base further including generally vertical side walls that extend downward from each of the edges of the top surface toward a floor or ground surface, wherein the side walls comprise multiple wall openings adapted to receive a removable horizontal post; and
   casters mounted to the bottom surface of the platform between the side walls, the casters and the side walls being dimensioned such that bottom edges of the side walls nearly touch the floor or ground surface on all sides of the base such that the casters are enclosed and protected by the side walls on all sides of the transport dolly.

2. The dolly of claim 1, wherein base, including its platform and side walls, is made from a single piece of material.

3. The dolly of claim 2, wherein the base is made of a single sheet of steel that has been folded to form the platform and side walls.

4. The dolly of claim 1, wherein the platform comprises multiple platform openings adapted to receive a removable vertical post.

5. The dolly of claim 4, wherein the platform openings are positioned near the edges of the top surface of the platform.

6. The dolly of claim 4, wherein the base further comprises a support structure associated with each platform opening in the platform, each support structure being adapted to support a vertical post that has been inserted into an associated platform opening.

7. The dolly of claim 6, wherein the support structures each comprise a bracket positioned on an inner side of a side wall and a lip that extends inward from the bottom edge of the side wall, wherein the post passes through the bracket and is supported by the lip.

8. The dolly of claim 1, wherein the wall openings are positioned near top edges of the side walls.

9. The dolly of claim 1, wherein the side walls further comprise openings adapted to receive tie-down straps.

10. The dolly of claim 1, further comprising wheels mounted to opposed side walls of the base.

11. The dolly of claim 10, wherein the wheels are mounted to the side walls such that the wheels do not contact the floor or ground surface when the surface is even.

12. The dolly of claim 1, wherein the horizontal platform is devoid of any components that extend above its flat, continuous upper surface.

13. The dolly of claim 1, wherein the horizontal platform excludes rollers that would enable the object to roll off of the top surface.

* * * * *